United States Patent
Johnson et al.

(10) Patent No.: US 9,238,481 B2
(45) Date of Patent: Jan. 19, 2016

(54) STEERING SYSTEM FOR TURNING MULTIPLE SETS OF STEERABLE WHEELS

(71) Applicant: TRW Automotive U.S. LLC, Livonia, MI (US)

(72) Inventors: James R. Johnson, Lafayette, IN (US); Kevin E. Boyle, Nashville, IN (US)

(73) Assignee: TRW Automotive U.S. LLC, Livonia, OH (US)

( * ) Notice: Subject to any disclaimer, the term of this patent is extended or adjusted under 35 U.S.C. 154(b) by 0 days.

(21) Appl. No.: 14/477,930

(22) Filed: Sep. 5, 2014

(65) Prior Publication Data

US 2014/0367188 A1 Dec. 18, 2014

Related U.S. Application Data

(63) Continuation-in-part of application No. 13/832,981, filed on Mar. 15, 2013, now Pat. No. 9,046,134.

(51) Int. Cl.
- *B62D 7/15* (2006.01)
- *B62D 7/14* (2006.01)
- *F16D 3/10* (2006.01)
- *F16D 7/04* (2006.01)

(52) U.S. Cl.
CPC .............. *B62D 7/1563* (2013.01); *B62D 7/14* (2013.01); *B62D 7/1527* (2013.01); *B62D 7/1536* (2013.01); *F16D 3/10* (2013.01); *F16D 7/044* (2013.01)

(58) Field of Classification Search
CPC ........ B62D 7/14; B62D 7/142; B62D 7/1536; B62D 5/06
USPC .................................... 180/414, 415
See application file for complete search history.

(56) References Cited

U.S. PATENT DOCUMENTS

| 5,199,523 A * | 4/1993 | Abe et al. ........................ 180/415 |
| 6,945,350 B2 | 9/2005 | Szabela |
| 7,484,588 B2 | 2/2009 | Szabela et al. |
| 8,695,750 B1 * | 4/2014 | Hammond et al. ........... 180/403 |

* cited by examiner

*Primary Examiner* — Kevin Hurley
(74) *Attorney, Agent, or Firm* — Tarolli, Sundheim, Covell & Tummino LLP

(57) ABSTRACT

A steering system for turning multiple sets of steerable wheels comprises three steering gears operatively connected to the steerable wheels. Each steering gear includes a control valve assembly and has an associated hydraulic motor. The first control valve assembly directs pressurized fluid to a first hydraulic motor and also directs pressurized fluid to a second hydraulic motor. The third control valve assembly directs pressurized fluid to a third hydraulic motor. When a torque below a predetermined value is applied to an output shaft of the second steering gear, the output shaft rotates in response to movement of the first control valve assembly, and the second control valve assembly remains in a neutral condition. When a torque above the predetermined value is applied to the output shaft of the second steering gear, the output shaft rotates to cause the second control valve assembly to assume an actuated condition to direct pressurized fluid away from the second hydraulic motor.

6 Claims, 7 Drawing Sheets

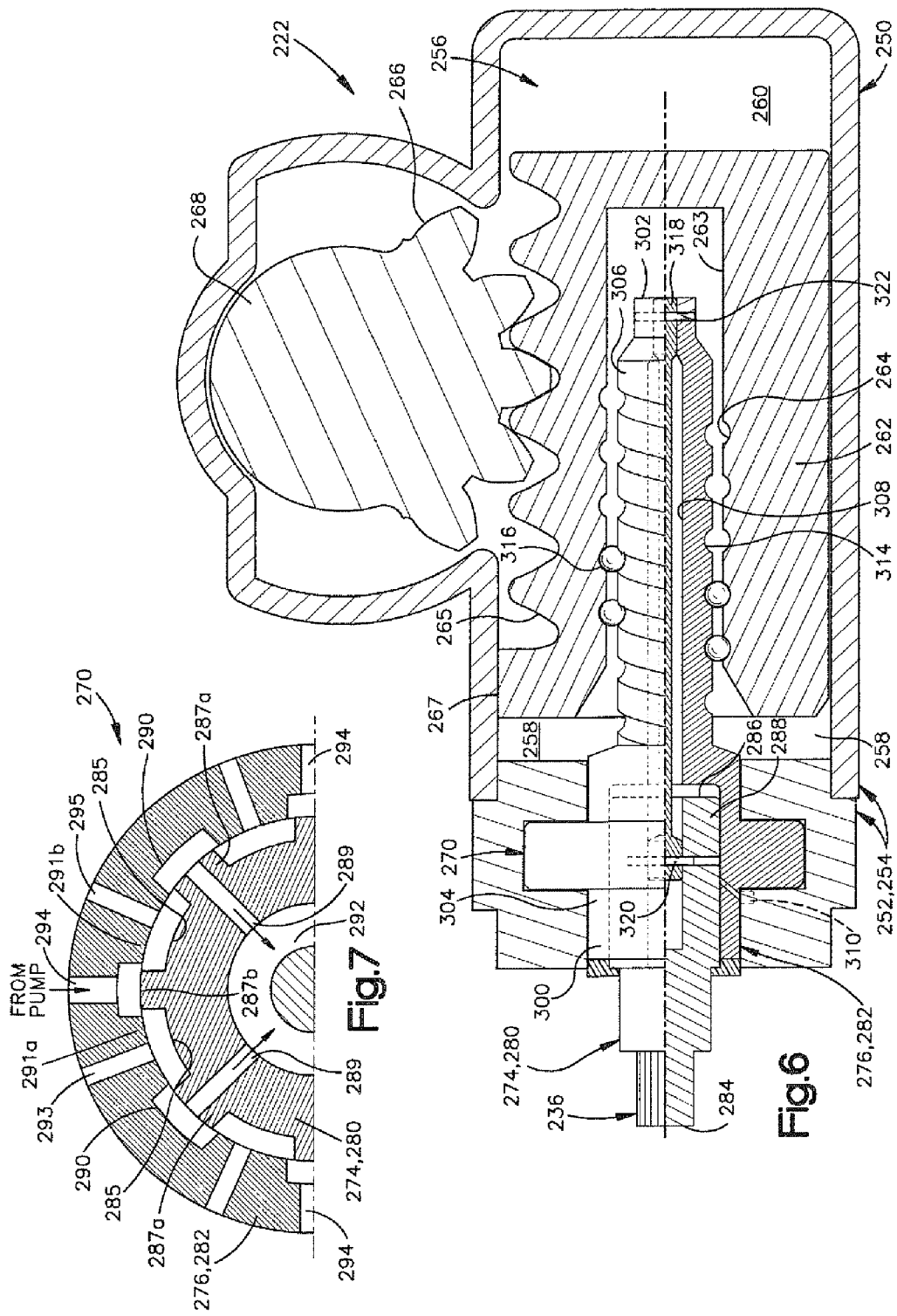

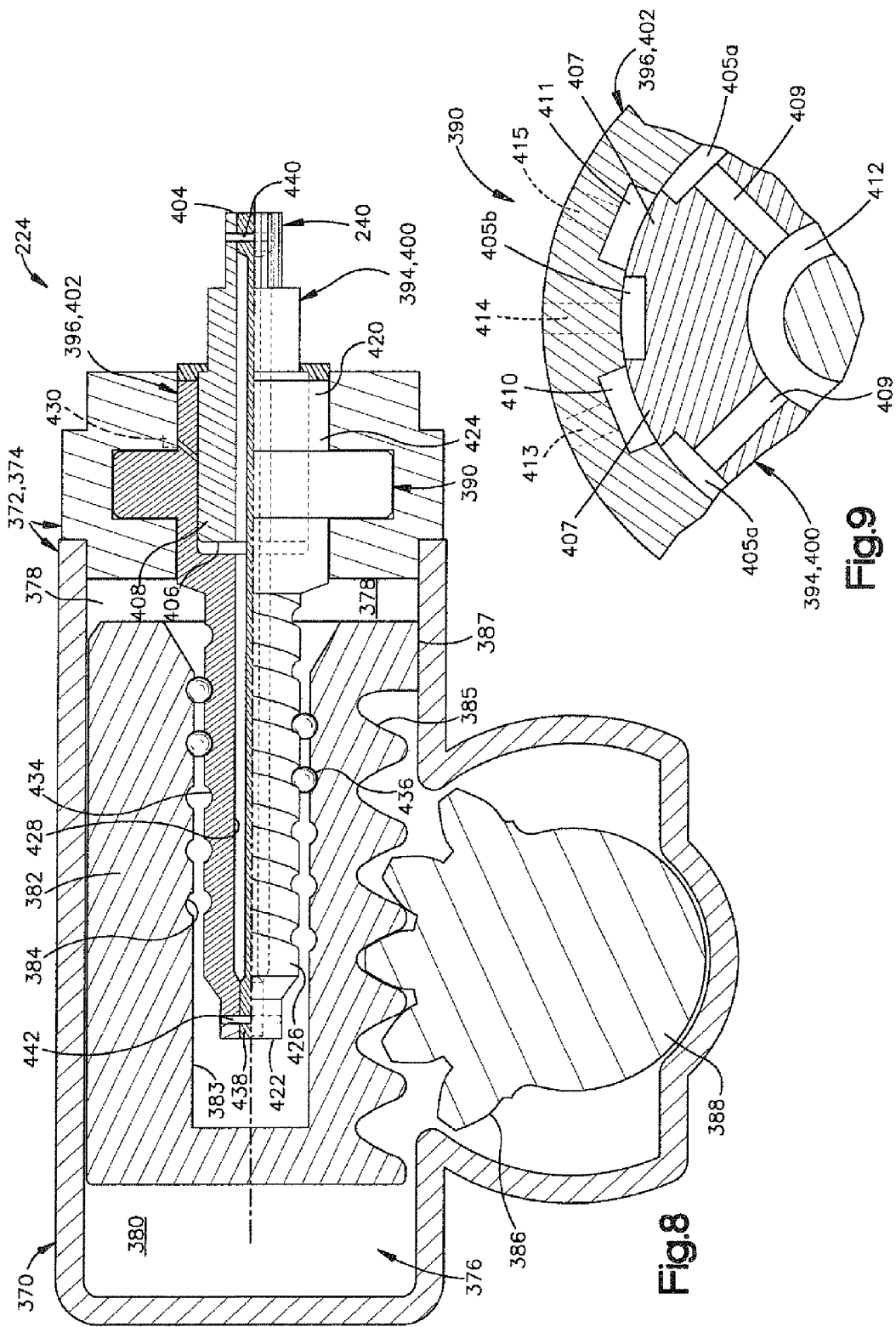

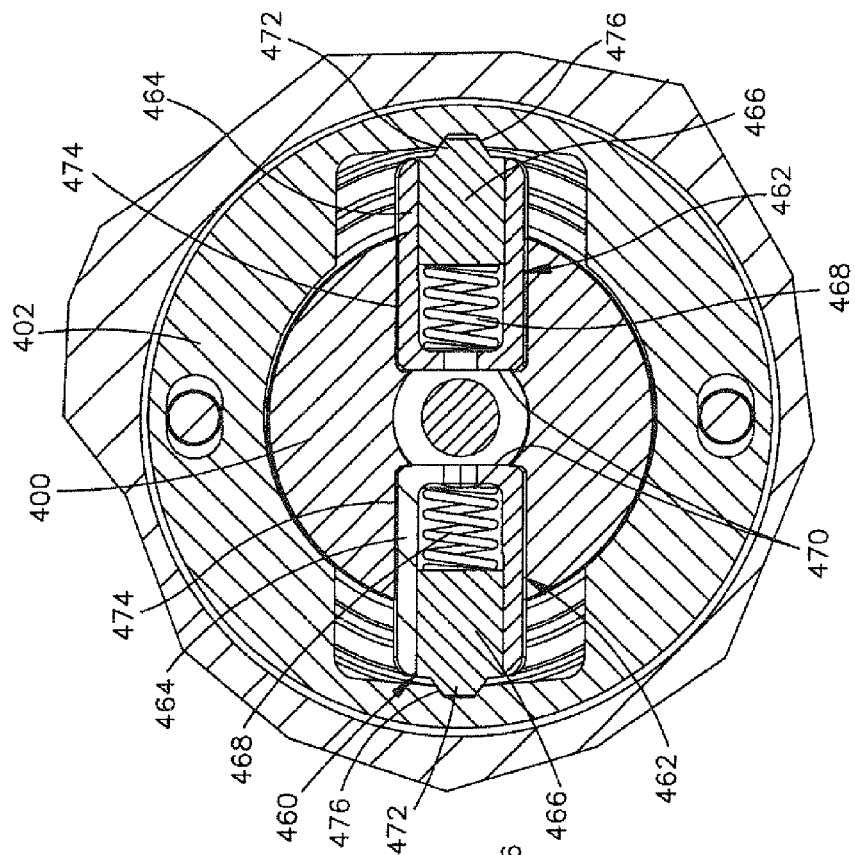
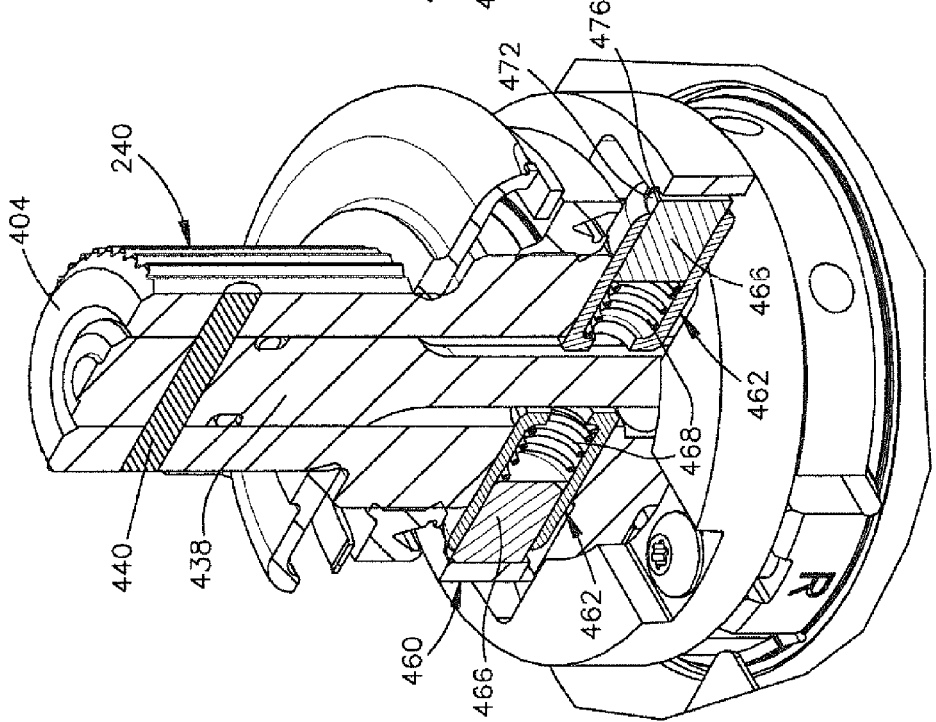

STEERING SYSTEM FOR TURNING MULTIPLE SETS OF STEERABLE WHEELS

RELATED APPLICATION

This application claims the benefit of U.S. patent application Ser. No. 13/832,981, which was filed on Mar. 15, 2013.

TECHNICAL FIELD

The present invention relates to a steering system for use in turning multiple sets of steerable wheels of a vehicle, and more specifically, to such a steering system comprising multiple steering gears.

BACKGROUND OF THE INVENTION

A known steering apparatus for turning rear steerable wheels of a vehicle includes a steering gear actuatable in response to turning of a steering wheel. The steering apparatus includes a shaft extending from a steering gear connected to a front steering linkage to a steering gear connected to a rear steering linkage. The shaft rotates in response to turning of the steering wheel to actuate the rear steering gear and turn the rear steerable wheels.

SUMMARY OF THE INVENTION

The present invention is generally directed to a steering system for use in turning multiple sets of steerable wheels of a vehicle, and more specifically, to such a steering system comprising multiple steering gears.

In a representative embodiment of the present invention, a steering system for turning multiple sets of steerable wheels comprises a first steering gear operatively connected to a steering wheel and to a first set of steerable wheels to effect turning of the first set of steerable wheels in response to rotation of the steering wheel. The first steering gear includes a first control valve assembly. The first control valve assembly directs pressurized fluid to a first hydraulic motor and allows fluid to return from the first hydraulic motor. The first hydraulic motor is operatively connected to the first set of steerable wheels. The steering system also comprises a second steering gear operatively connected to the first set of steerable wheels and fluidly connected to the first steering gear to assist in turning of the first set of steerable wheels in response to rotation of the steering wheel. The second steering gear includes a second control valve assembly. The first control valve assembly is fluidly connected to a second hydraulic motor such that the first control valve assembly directs pressurized fluid to the second hydraulic motor and allows fluid to return from the second hydraulic motor. An output shaft of the second steering gear rotates in response to movement of the first control valve assembly when a torque below a predetermined value is applied to the output shaft. The second control valve assembly remains in a neutral condition when the torque below a predetermined value is applied to the output shaft. The output shaft rotates to cause the second control valve assembly to assume an actuated condition to direct pressurized fluid away from the second hydraulic motor when a torque above the predetermined value is applied to the output shaft of the second steering gear.

In another embodiment of the present invention, a steering system for turning multiple sets of steerable wheels comprises a first steering gear operatively connected to a steering wheel and to a first set of steerable wheels to effect turning of the first set of steerable wheels in response to rotation of the steering wheel. The first steering gear includes a first control valve assembly. The first control valve assembly directs pressurized fluid to a first hydraulic motor and allows fluid to return from the first hydraulic motor. The first hydraulic motor is operatively connected to the first set of steerable wheels. The steering system also comprises a second steering gear operatively connected to the first set of steerable wheels and fluidly connected to the first steering gear to assist in turning of the first set of steerable wheels in response to rotation of the steering wheel. The second steering gear includes a second control valve assembly. The second control valve assembly is capable of allowing fluid to return from a second hydraulic motor. The steering system further comprises a third steering gear operatively connected to a second set of steerable wheels and to an output shaft of the second steering gear to effect turning of the second set of steerable wheels in response to rotation of the steering wheel. The third steering gear includes a third control valve assembly. The third control valve assembly directs pressurized fluid to a third hydraulic motor and allows fluid to return from the third hydraulic motor. The third hydraulic motor is operatively connected to the second set of steerable wheels. The second hydraulic motor is fluidly connected to the first control valve assembly such that the first control valve assembly directs pressurized fluid to the second hydraulic motor and allows fluid to return from the second hydraulic motor. The output shaft of the second steering gear rotates in response to movement of the first control valve assembly when a torque below a predetermined value is applied to the output shaft. The second control valve assembly remains in a neutral condition when the torque below a predetermined value is applied to the output shaft. The output shaft rotates to cause the second control valve assembly to assume an actuated condition to direct pressurized fluid away from the second hydraulic motor when a torque above the predetermined value is applied to the output shaft of the second steering gear.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 6 is a sectional view of a first integral power steering gear that is part of the steering system of FIG. 5;

FIG. 7 is a schematic sectional view of a control valve that is part of the integral power steering gear of FIG. 6;

FIG. 8 is a sectional view of a second integral power steering gear that is part of the steering system of FIG. 5;

FIG. 9 is a schematic sectional view of a control valve that is part of the integral power steering gear of FIG. 8;

FIG. 10 is a perspective view, partially broken away, of a portion of the first integral power steering gear of FIG. 6; and FIG. 11 is a top view, partially broken away, of a portion of the first integral power steering gear of FIG. 6.

DETAILED DESCRIPTION OF EMBODIMENTS

Figure 1:
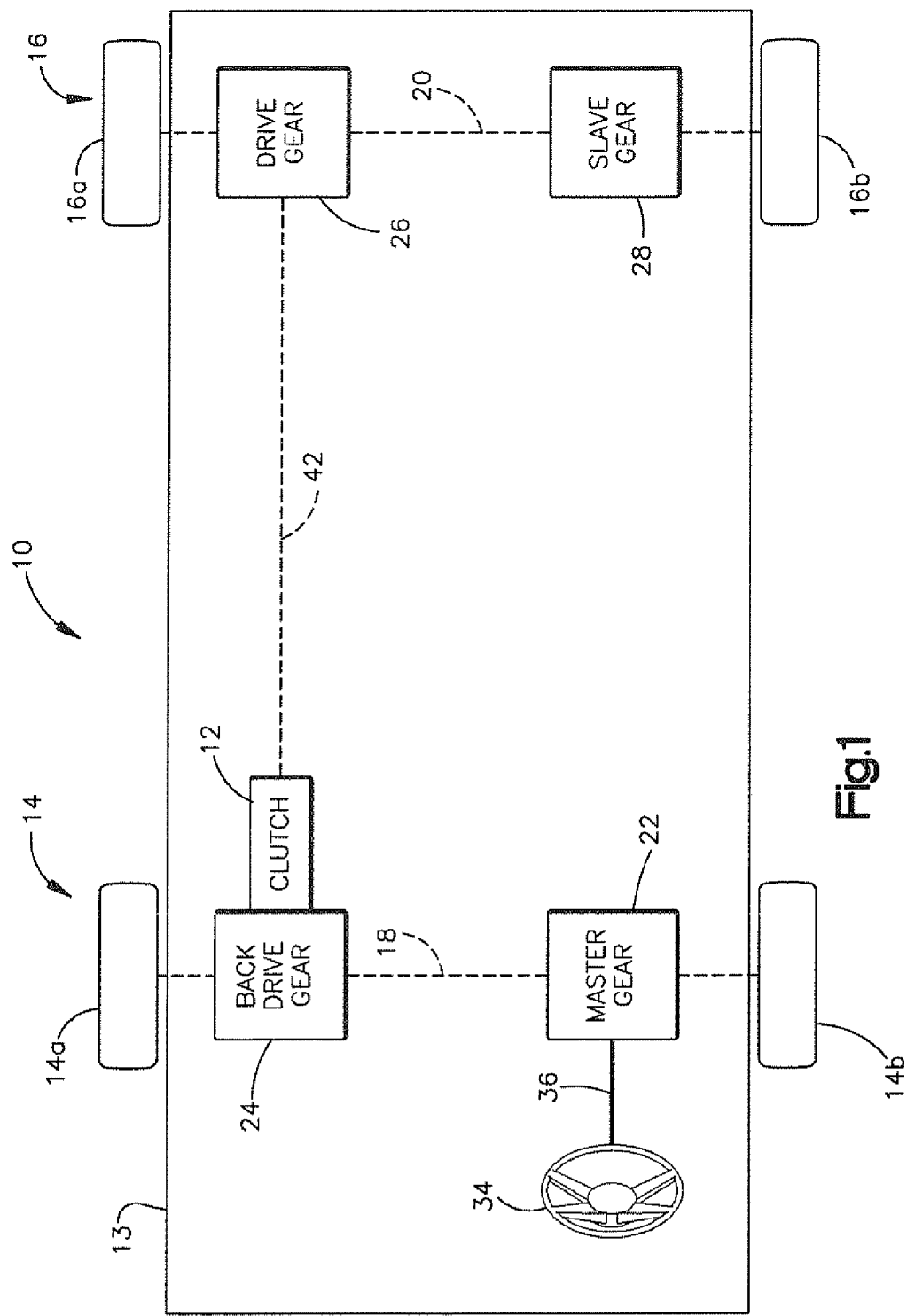
FIG. 1 is a schematic block diagram illustrating a steering apparatus with a steering gear clutch constructed in accordance with one embodiment of the present invention.

FIG. 1 is a schematic block diagram illustrating a steering apparatus 10 having a steering gear clutch 12 constructed in accordance with the present invention. The steering apparatus 10 is mounted to a vehicle 13 having a front set 14 of steerable wheels and a rear set 16 of steerable wheels. The front set 14 of steerable wheels includes wheels 14a and 14b and the rear set 16 of steerable wheels includes wheels 16a and 16b. Wheels 14a and 14b are mounted on opposite ends of a front steering linkage 18 in a manner such that movement of the front steering linkage results in turning of wheels 14a and 14b to turn the vehicle 13. Likewise, wheels 16a and 16b are mounted on opposite ends of a rear steering linkage 20 in a manner such that movement of the rear steering linkage results in turning of wheels 16a and 16b.

The steering apparatus 10 includes a first or master steering gear 22 and a second or back drive gear 24. The first and second gears 22 and 24 are operatively connected to the front steering linkage 18 in a known manner. The steering apparatus 10 also includes a third or drive gear 26 and a fourth or slave gear 28. The third and fourth gears 26 and 28 are operatively connected to the rear steering linkage 20 in a known manner. Preferably, the first, second, third and fourth gears 22, 24, 26 and 28 are integral steering gears. An exemplary integral steering gear that may be used is described in U.S. Pat. No. 6,945,350.

The first or master steering gear 22 is actuatable in response to rotation of a vehicle steering wheel 34 to effect movement of the front steering linkage 18 to turn the front set 14 of steerable wheels. An input shaft 36 of the first steering gear 22 may be operatively connected to the steering wheel 34 in a known manner. Alternatively, the input shaft 36 of the first steering gear 22 may be actuated by an electric motor (not shown) that is responsive to operator-applied steering inputs to the steering wheel 34.

The second or back drive gear 24 is also actuatable in response to rotation of the vehicle steering wheel 34. A sector gear (not shown) of the second gear 24 rotates in response to rotation of the steering wheel 34 in a known manner. An output shaft (not shown) of the second gear 24 rotates in response to rotation of the sector gear in a known manner.

The clutch 12 may transmit rotation of the output shaft of the second gear 24 to a shaft 42 operatively connected to the third or drive gear 26 when in an engaged condition. The clutch 12 does not transmit rotation of the output shaft of the second gear 24 to the shaft 42 when in a disengaged condition. The clutch 12 may be connected to a housing of the second gear 24. It is contemplated that the clutch 12 may be connected to a frame of the vehicle or the housing of the third or drive gear 26.

The third or drive gear 26 is actuatable in response to rotation of the shaft 42 to effect movement of the rear steering linkage 20 to turn the rear set 16 of steerable wheels. The fourth or slave gear 28 is also actuatable in response to rotation of the shaft 42.

The steering gear clutch 12 may transmit rotation of the output shaft of the second gear 24 to the third gear 28 when in the engaged condition. The clutch 12 does not transmit rotation of the output shaft of the second gear 24 to the third gear 28 when in the disengaged condition. The clutch 12 is in the engaged condition when the torque applied to the output shaft of the second gear 24 is below a predetermined value. The clutch 12 moves to the disengaged condition when the torque applied to the output shaft of the second gear 24 is above the predetermined value. In this way, the clutch 12 helps prevent a large torque from being applied to the third gear that could damage the third gear.

The clutch 12 may also provide a dwell in the steering system 10. The clutch 12 may only transmit rotation of the output shaft of the second gear 24 to the third gear 26 after the output shaft of the second gear has rotated through a predetermined angle. Therefore, the third and fourth gears 26, 28 are only actuatable after the front steering linkage has moved a desired amount. Thus, the rear steering linkage 20 only moves after the front steering linkage 18 moves a predetermined amount. Typically, it is desired that the rear steering linkage 20 does not move until the front set 14 of steerable wheels are turned a predetermined angle from a straight ahead or initial position, such as when a parking maneuver is being performed. Thus, the rear set 16 of steerable wheels are not turned during an initial turning of the front set 14 of steerable wheels from a straight ahead position.

Figure 2:
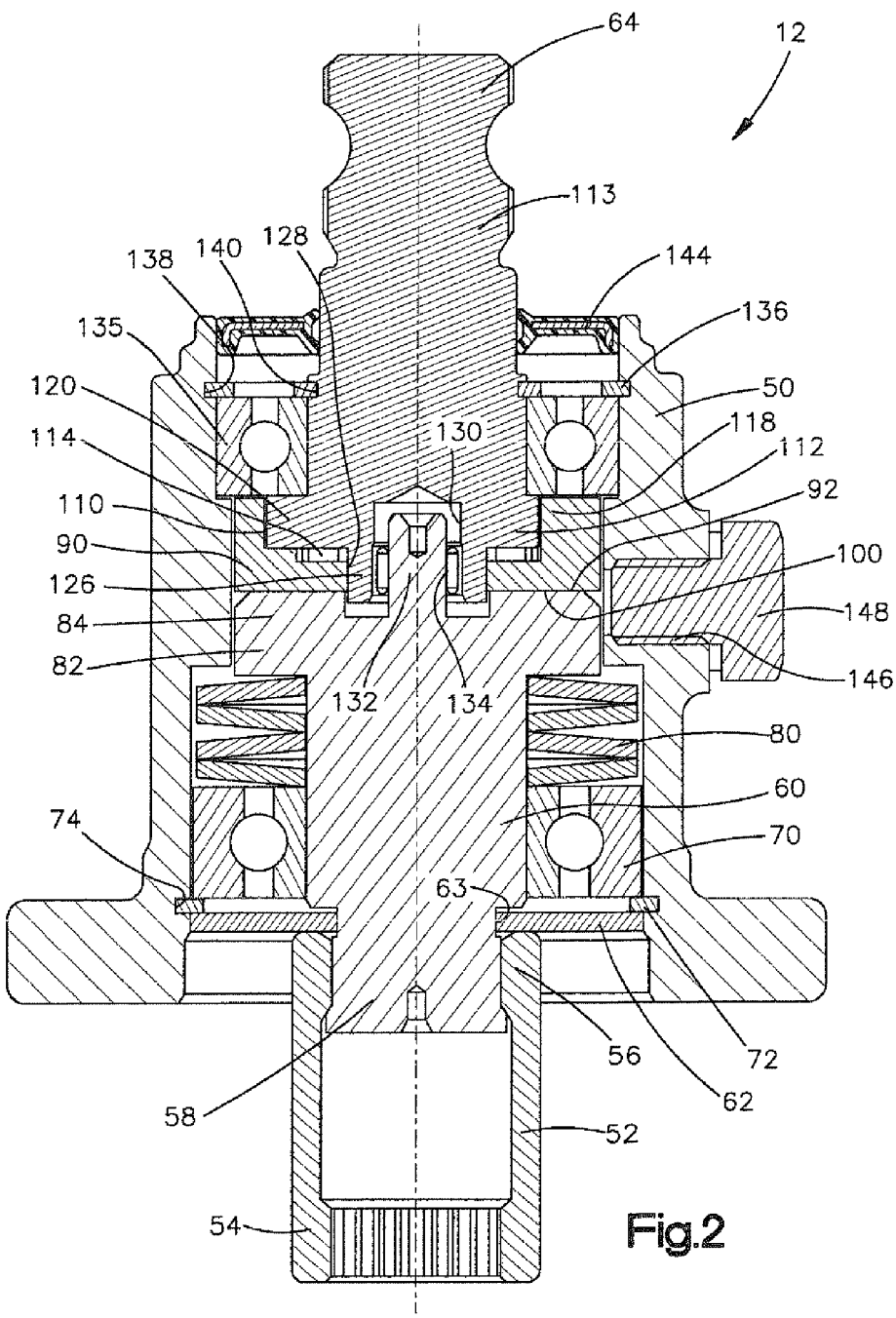
FIG. 2 is a schematic sectional view of the steering gear clutch of FIG. 1.

The steering gear clutch 12 (FIG. 2) includes a housing 50. The housing 50 may be connected to the second gear 24 in any desired manner. It is contemplated that the housing 50 may be connected to the second gear 24, a frame of the vehicle 13, or the third gear 26.

The housing 50 rotatably supports a coupling sleeve 52. The coupling sleeve 52 has a first end 54 connectable with the output shaft of the second or back drive gear 24 so that the coupling sleeve rotates with the output shaft of the second gear. The coupling sleeve 52 has a second end 56 connected to a first end 58 of an input shaft 60. The second end 56 of the coupling sleeve 52 may have a splined connection with the first end 58 of the input shaft 60 so that the input shaft rotates with the coupling sleeve. The splined connection also allows the input shaft 60 to move axially relative to the coupling sleeve 52. A washer 62 extends into a groove 63 in the input shaft 60 to limit axial movement of the input shaft relative to the coupling sleeve 52 and the housing 50. The clutch 12 has an output shaft 64 operatively connected with the shaft 42 connected to the third or drive gear 26.

The input shaft 60 is rotatably supported in the housing 50 by bearings 70. The bearings 70 may be held in the housing 50 by a snap ring 72. The snap ring 72 extends into a groove 74 in the housing 50 and engages the bearings 70 to retain the bearings in the housing.

At least one spring 80 urges the input shaft 60 axially toward the output shaft 64. The springs 80 engage the bearings 70 and a radially extending flange 82 on a second end portion 84 of the input shaft 60. The springs 80 urge the second end portion 84 of the input shaft 60 into engagement with a dog disc 90 of the output shaft 64. The clutch 12 is shown as having four spring washers 80 urging the input shaft into engagement with the dog disc 90. It is contemplated that any number or type of spring may be used.

Figure 3:
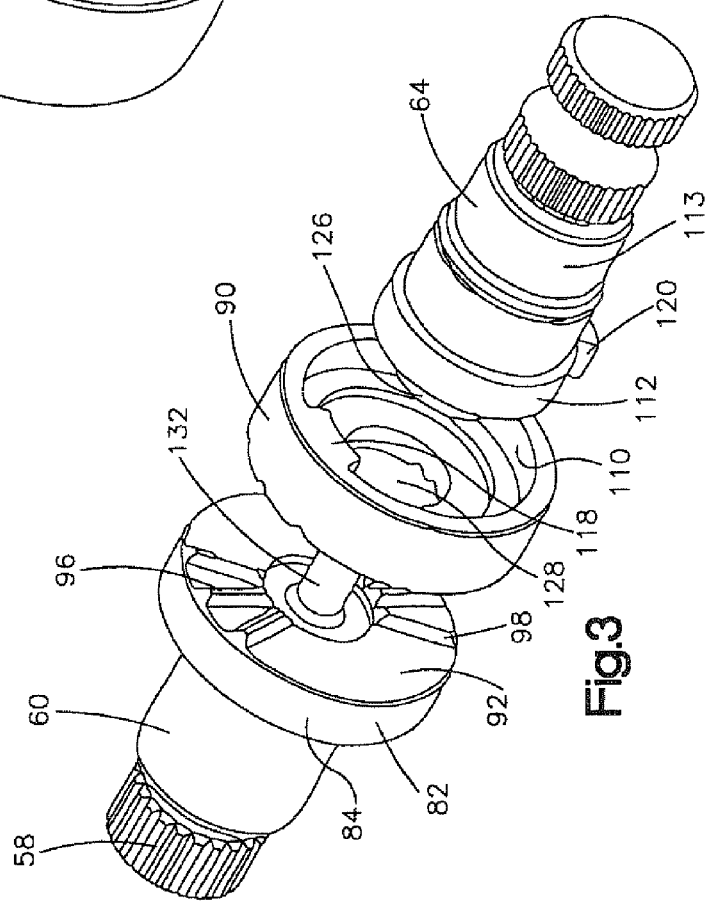
FIG. 3 is a schematic exploded pictorial view of the steering gear clutch of FIG. 2.

An axial end surface 92 (FIG. 3) of the flange 82 has a first set of radially extending teeth 96 and a second set of radially extending teeth 98. The first and second sets of teeth 96, 98 are circumferentially spaced from each other. The first set of teeth 96 is located radially opposite from the second set of teeth 98. It is contemplated that the first set of teeth 96 may be spaced circumferentially any desired distance from the second set of teeth 98. Each set of teeth 96 and 98 includes three teeth. Although only two sets of teeth 96, 98 are shown, the axial end surface 92 may have any desired number of sets of teeth. Furthermore, each set of teeth may have any desired number of teeth.

Figure 4:
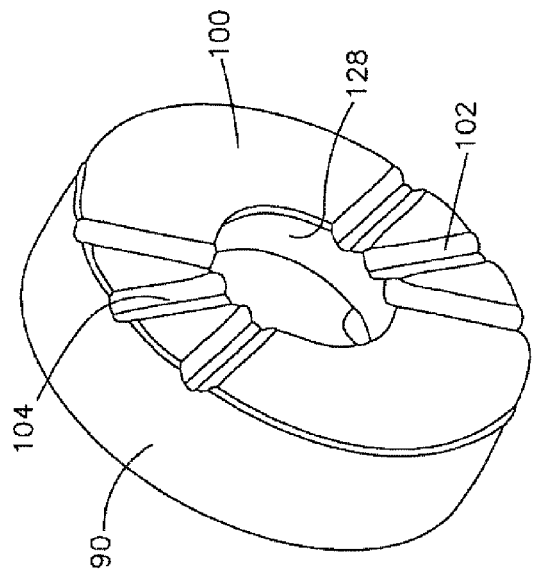
FIG. 4 is a pictorial view of a dog disk of the steering gear clutch of FIG. 3.

An axial end surface 100 (FIG. 4) of the dog disc 90 has a first set of radially extending grooves 102 and a second set of radially extending grooves 104. Each of the first and second sets of grooves 102 and 104 has the same number of grooves as the first and second sets of teeth 96, 98. The first set of grooves 102 normally receives the first set of teeth 96 on the input shaft 60. The second set of grooves 104 normally receives the second set of teeth 98 on the input shaft 60. Therefore, when the first and second sets of teeth 96, 98 are located in the first and second sets of grooves 102, 104, the input shaft 60 and the dog disc 90 may rotate together. If the first and second sets of teeth 96, 98 are not received in the first and second sets of grooves 102, 104 then the input shaft 60 and the dog disc 90 may rotate relative to each other. Although the input shaft 60 is shown as having sets of teeth 96, 98 and the dog disc 90 is shown as having sets of grooves 102, 104, it is contemplated that the input shaft may have grooves that mesh with teeth on the dog disc.

The first and second sets of grooves 102, 104 are circumferentially spaced from each other. The first set of grooves 102 is located radially opposite from the second set of grooves 104. It is contemplated that the first set of grooves 102 may be spaced circumferentially any desired distance from the second set of grooves 104. Each set of grooves 102 and 104 includes three grooves. Although only two sets of grooves 102, 104 are shown, the axial end surface 100 of the dog disc 90 may have any desired number of sets of grooves. Furthermore, each set of grooves may have any desired number of grooves.

The springs 80 urge the first and second sets of teeth 96, 98 into meshing engagement with the first and second sets grooves 102, 104. When the toque applied to the input shaft 60 is below the predetermined value, the force applied by the springs 80 is large enough to hold the first and second sets of teeth 96, 98 in meshing engagement with the first and second sets of grooves 102, 104. When the torque applied to the input shaft 60 is above the predetermined value, the force applied by the springs 80 is not large enough to hold the first and second sets of teeth 96, 98 in meshing engagement with the first and second sets of grooves 102, 104. When the torque applied to the input shaft 60 is above the predetermined value, the input shaft 60 rotates relative to the dog disc 90 of the output shaft 64 and moves axially away from the dog disc to compress the springs 80. Once the first and second sets of teeth 96, 98 are aligned with the first and second sets of grooves 102, 104, the first and second sets of teeth mesh with the first and second sets of grooves so that the input shaft 60 and the dog disc 90 may rotate together relative to the housing 50.

The dog disc 90 of the output shaft 64 (FIGS. 2 and 3) includes a recess 110. A first end 112 of a shaft portion 113 of the output shaft 64 extends into the recess 110. Bearings 114, such as needle thrust bearings, support the dog disc 90 for rotation relative to the shaft portion 113 of the output shaft 64.

The dog disc 90 includes a radially inwardly extending projection or dog 118. The radially inwardly extending projection 118 may engage a radially outwardly extending projection or dog 120 on the first end 112 of the shaft portion 113. When the projection 118 on the dog disc 90 engages the projection 120 on the shaft portion 113, the dog disc and the shaft portion 113 rotate together relative to the housing 50. If the projections 118 and 120 are spaced circumferentially from each other, then the dog disc 90 rotates relative to the shaft portion 113. The dog disc 90 does not transmit rotation of the input shaft 60 to the shaft portion 113 when the projections 118, 120 are spaced from each other. The projection 118 is circumferentially spaced from the projection 120 when the first set 14 of steerable wheels are in a straight ahead or initial position so that the vehicle 13 does not turn.

The shaft portion 113 of the output shaft 64 (FIG. 2) includes an axially extending projection 126. The axially extending projection 126 extends through an opening 128 in the dog disc 90. The axially extending projection 126 includes an axially extending recess 130. An axially extending projection 132 on the input shaft 60 extends into the recess 130 and through the opening 128. Bearings 134 located in the recess 130 engage the projection 132 to support the input shaft 60 and the shaft portion 113 for rotation relative to each other.

The shaft portion 113 of the output shaft 64 is rotatably supported in the housing 50 by bearings 135. The bearings 135 are held in the housing 50 by a snap ring 136 extending into a groove 138 in the housing. The snap ring 136 also extends into a groove 140 in shaft portion 113.

A seal 144 may extend between the shaft portion 113 of the output shaft 64 and the housing 50 to retain lubricant in the housing. The housing 50 may include a port 146. The port 146 may be used for filling the housing 50 with lubricant and/or for inspection of the interface between the input shaft 62 and the dog disc 90. A plug 148 threadably engages the housing 50 to close the port 146.

In operation, the first or master steering gear 22 is actuated in response to rotation of the vehicle steering wheel 34. Actuation of the first steering gear 22 effects movement of the front steering linkage 18 to turn the front set 14 of steerable wheels. The second or back drive gear 24 is also actuated in response to rotation of the steering wheel 34.

Actuation of the second or back drive gear 24 effects rotation of the output shaft (not shown) of the second gear. The coupling sleeve 52 and the input shaft 60 of the clutch 12 rotate with the output shaft of the second gear. If the torque applied to the input shaft 60 is below a predetermined value, the first and second sets of teeth 96, 98 on the input shaft remain in meshing engagement with the first and second sets of grooves 102, 104 on the dog disc 90. The force applied by the springs 80 retains the first and second sets of teeth 96, 98 in the first and second sets of grooves 102, 104. The dog disc 90 rotates with the input shaft 60 when the torque is below the predetermined value.

The input shaft 60 and the dog disc 90 rotate together relative to the shaft portion 113 of the output shaft 64 and the housing 50 if the projection 118 on the dog disc is spaced from the projection 120 on the output shaft. The rotation of the input shaft 60 and the dog disc 90 relative to the shaft portion 113 of the output shaft 64 prevents the third or drive gear 26 from being actuated. Therefore, the shaft portion 113 of the output shaft 64 does not rotate until the input shaft 60 rotates through a desired angle and the projection 118 on the dog disc 90 engages the projection 120 on the shaft portion 113. The desired angle may be between 120 degrees and 140 degrees and is approximately 130 degrees. The spacing of the projections 118 and 120 provides a dwell in which the third gear 26 does not actuate the rear set 16 of steerable wheels. Thus, the third gear is not actuated until the first set 14 of steerable wheels have turned a desired angle.

When the projection 118 on the dog disc 90 engages the projection 120 on the shaft portion 113 of the output shaft 64, the shaft portion rotates together with the input shaft 60 and the dog disc 90 relative to the housing 50. The shaft 42 rotates in response to rotation of the shaft portion 113 of the output shaft 64. The third or drive gear 26 and the fourth or slave gear 28 are actuated in response to rotation of the shaft 42 to turn the rear set 16 of steerable wheels. It is contemplated that a ratio change box (not shown) may interconnect the output shaft 64 of the clutch 12 and the shaft 42. The ratio change box may change the gear ratio between the output shaft 64 and the shaft 42.

If the torque applied to the input shaft 60 is greater that the predetermined value, the input shaft rotates relative to the dog disc 90 to prevent damage to third or drive gear 26. The first and second sets of teeth 96, 98 move out of the first and second sets of grooves 102, 104 on the dog disc. The input shaft 60 moves axially away from the output shaft 64 relative to the dog disc 90 and the housing 50. Upon axial movement of the input shaft 60, the springs 80 are compressed further.

The input shaft 60 may rotate approximately 180 degrees relative to the dog disc 90 until the first set of teeth 96 meshingly engage the second set of grooves 104 and the second set of teeth 98 meshingly engage the first set of grooves 102. If the torque applied to the input shaft 60 is below the predetermined value when the first set of teeth 96 are aligned with the second set of grooves 104, then the first and second sets of teeth 96, 98 will meshingly engage the second and first sets of grooves 104, 102, respectively. The shaft portion 113 of the output shaft 64 will then rotate together with the dog disc 90 and the input shaft 60. The operator of the vehicle will sense that the movement of the rear set 16 of steerable wheels is not as it should be to give notice that there is a problem with the steering system 10. Once the operator is aware of a problem, the steering system 10 can be looked at to correct any problems.

It is contemplated that the dwell may not be necessary. If the dwell is not necessary, the first and second sets of grooves 102 and 104 may be formed on an axial end surface of the shaft portion 113 of the output shaft 64 and the dog disc 90 would be eliminated.

Figure 5:
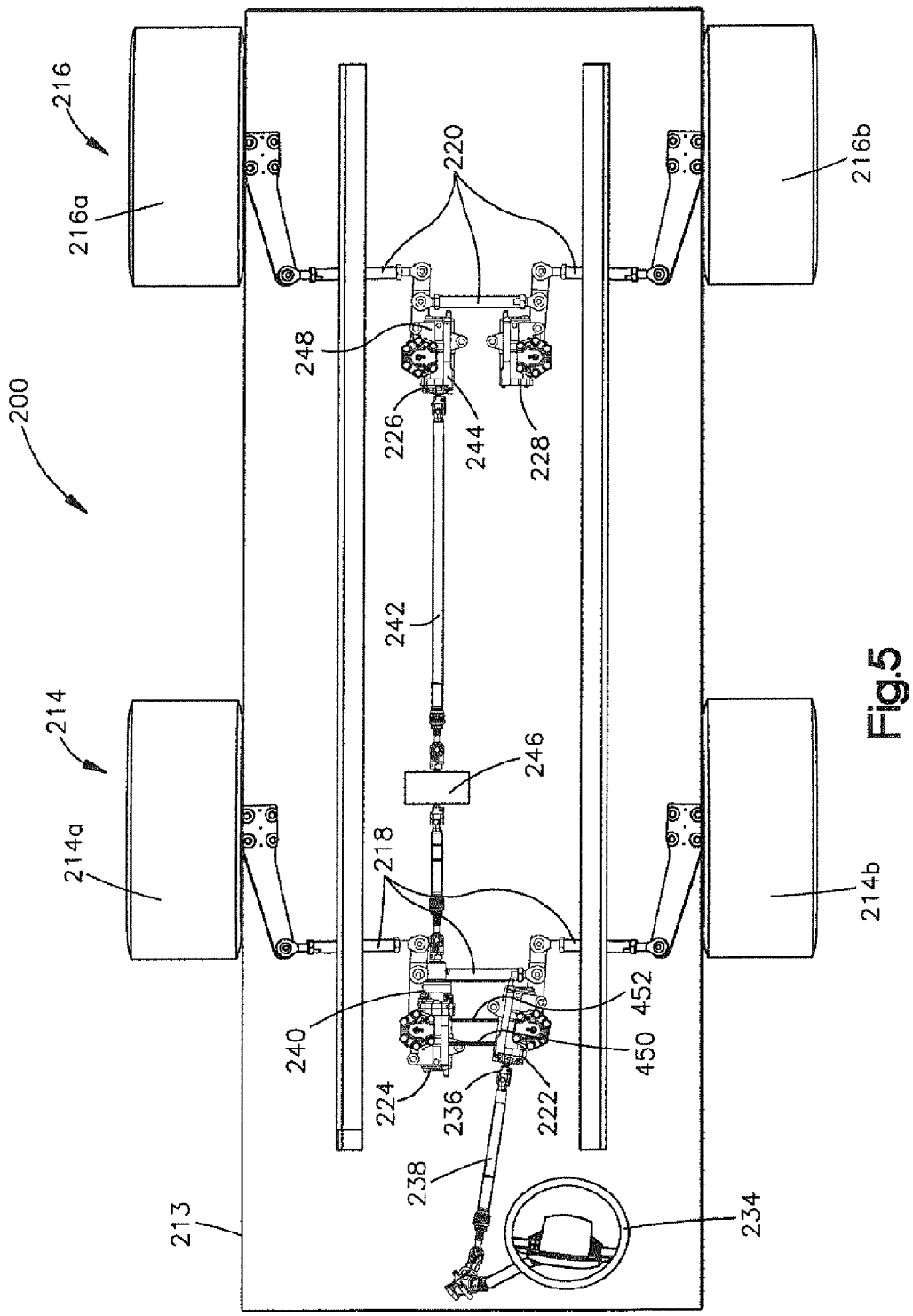
FIG. 5 is a pictorial view of a steering system in accordance with a second embodiment of the present invention.

FIG. 5 is a pictorial view of a steering system 200 in accordance with a second embodiment of the present invention. The steering system 200 is mounted to a vehicle 213 having a front set 214 of steerable wheels and a rear set 216 of steerable wheels. The front set 214 of steerable wheels includes steerable wheels 214a and 214b and the rear set 216 of steerable wheels includes steerable wheels 216a and 216b. Steerable wheels 214a and 214b are mounted on opposite ends of a front steering linkage 218 in a manner such that movement of the front steering linkage results in turning of steerable wheels 214a and 214b to turn the vehicle 213. Likewise, steerable wheels 216a and 216b are mounted on opposite ends of a rear steering linkage 220 in a manner such that movement of the rear steering linkage results in turning of steerable wheels 216a and 216b.

The steering system 200 includes a master or first steering gear 222 and a back drive or second steering gear 224. The first and second steering gears 222 and 224 are operatively connected to the front steering linkage 218 in a known manner. The steering system 200 also includes a drive or third steering gear 226 and a slave or fourth steering gear 228. The third and fourth steering gears 226 and 228 are operatively connected to the rear steering linkage 220 in a known manner. The first, second, third and fourth steering gears 222, 224, 226 and 228 are integral steering gears, such as the integral steering gear described in U.S. Pat. No. 6,945,350.

The master or first steering gear 222 is actuatable in response to rotation of a vehicle hand wheel or steering wheel 234 to effect movement of the front steering linkage 218 to turn the front set 214 of steerable wheels 214a and 214b. A rotatable input shaft 236 of the first steering gear 222 may be operatively connected to the steering wheel 234 in a known manner, such as through a steering shaft 238. Alternatively, the input shaft 236 of the first steering gear 222 may be actuated by an electric motor (not shown) that is responsive to operator-applied steering inputs to the steering wheel 234.

The back drive or second steering gear 224 is also actuatable in response to rotation of the vehicle steering wheel 234. As will be explained in greater detail below, the second steering gear 224 is actuated in response to hydraulic pressure or hydraulic pressure signals from the first steering gear 222. An output shaft 240 of the second steering gear 224 rotates in response to the hydraulic pressure or pressure signals.

The output shaft 240 of the second steering gear 224 is operatively connected to a shaft 242, which, in turn, is operatively connected to the drive or third steering gear 226. Specifically, the output shaft 240 of the second steering gear 224 is operatively coupled to a control valve assembly 244 of the third steering gear 226. The third steering gear 226 is actuatable in response to rotation of the shaft 242 to effect movement of the rear steering linkage 220 to turn the rear set 216 of steerable wheels 216a and 216b. The slave or fourth steering gear 228 is also actuatable in response to rotation of the shaft 242. As shown in FIG. 5, an optional ratio change box 246 may interconnect the output shaft 240 of the second steering gear 224 and the shaft 242. If included in the steering system 200, the ratio change box 246 changes the gear ratio between the output shaft 240 and the shaft 242.

As shown in FIG. 6, the first steering gear 222 is an integral hydraulic power steering gear, which includes a first hydraulic fluid motor 250 and an open center, first control valve assembly 270. The first control valve assembly 270, which is illustrated in greater detail in FIG. 7, directs hydraulic fluid flow to actuate the first hydraulic fluid motor 250, as is known in the art.

The first steering gear 222 includes a two-piece housing 252 that forms a hydraulic power cylinder 254. The hydraulic power cylinder 254 defines an internal chamber 256 that receives a piston 262. The piston 262 divides the chamber 256 into a first chamber portion 258 and a second chamber portion 260.

The piston 262 includes an inner surface 263 that defines a bore extending axially into the piston 262 from one end. The inner surface 263 includes a helical groove 264. The piston 262 also has an external surface 267 that includes a set of external teeth 265. The teeth 265 mesh with a sector gear 266. The sector gear 266 is fixed to an output shaft 268, which extends outwardly from the housing 252. The output shaft 268 is connected to a pitman arm (not shown) which, in turn, is connected via the front steering linkage 218 to the front set 214 of steerable wheels to steer the vehicle 213. As the piston 262 moves in the chamber 256, the output shaft 268 is rotated to operate the front steering linkage 218, which turns the steerable wheels 214a, b of the vehicle 213.

The first control valve assembly 270 controls the flow of pressurized hydraulic fluid between a source of high pressure hydraulic fluid (not shown), such as a pump, and one of the first and second chamber portions 258 and 260 to control the direction and amount of steering. The first control valve assembly 270 is actuated by the rotatable input shaft 236. The input shaft 236 is rotated by the vehicle steering wheel 234 and the steering shaft 238.

The first control valve assembly 270 comprises first and second valve members 274 and 276, respectively. The first valve member 274 comprises a rotatable valve core 280. The second valve member 276 comprises a rotatable valve sleeve 282. The valve core 280 is located coaxially within the valve sleeve 282 and is supported by the valve sleeve for rotation relative to the valve sleeve. The valve core 280 is formed in one piece with the input shaft 236. The valve core 280 has oppositely disposed first and second axial end portions 284 and 286, respectively, and a valve section 288 between the end portions. The first axial end portion 284 of the valve core 280 projects beyond the valve sleeve 282. The second axial end portion 286 of the valve core 280 lies within the valve sleeve 282.

The valve section 288 of the valve core 280 has a plurality of circumferentially spaced, axially extending grooves 285 (FIG. 7) disposed between circumferentially spaced, axially extending lands 287a and b, as is known in the art. The valve core lands 287a are in fluid communication with an internal return axial passage 292 via return radial passages 289. The internal return axial passage 292 extends from the valve section 288 of the valve core 280 to the second axial end portion 286. The internal return axial passage 292 communicates via passages (not shown) with a return line (not shown) communicating with a reservoir (not shown) of hydraulic fluid. The valve core grooves 285 and the valve core grooves 287b are not connected in direct fluid communication with the internal return axial passage 292. The grooves 285 and the lands 287b are also not directly connected with any radial passage corresponding to the return radial passages 289.

The valve sleeve 282 has oppositely disposed first and second axial end portions 300 and 302, respectively. The valve sleeve 282 further includes a sleeve section 304 adjacent the first axial end portion 300 and a ball screw section 306 adjacent the second axial end portion 302. An elongated passage 308 extends axially from the first axial end portion 300 of the valve sleeve 282 through the sleeve section 304 and the ball screw section 306 to the second axial end portion 302.

The first axial end portion 300 of the valve sleeve 282 includes first and second lugs (not shown) that are disposed in diametrically opposed cut-outs (not shown) in the valve core 280. After rotation of the valve core 280 through an angle of between 2° and 8° relative to the valve sleeve 282, the lugs engage the cut-outs in the valve core to cause the valve sleeve to be rotated along with the valve core. Such rotation of the valve sleeve 282 together with the valve core 280 causes the piston 262 to move axially in the chamber 256 and, hence, allows for manual steering of the vehicle even if a loss in hydraulic fluid pressure has occurred.

The sleeve section 304 of the valve sleeve 282 includes a plurality of radial passages 294, which extend from the outer circumference of the sleeve section to the inner circumference of the sleeve section. The radial passages 294 communicate with a chamber 310 in the housing 252. The chamber 310 is fluidly connected to or in fluid communication with a source of high pressure hydraulic fluid, such as a hydraulic pump (not shown).

Circumferentially spaced, axially extending grooves 290 are formed in the inner circumferential surface of the valve sleeve 282 between axially extending lands 291, as is known in the art. Lands 291a in the valve sleeve 282 are fluidly connected to or in fluid communication with the first chamber portion 258 in the housing 252 via radially extending passages 293. Lands 291b are fluidly connected to or in fluid communication with the second chamber portion 260 in the housing 252 via radially extending passages 295. As is known in the art, when the valve core 280 is rotated relative to the valve sleeve 282, hydraulic fluid is ported through the grooves and associated passages to one of the first and second chamber portions 258 and 260, while the hydraulic fluid is simultaneously vented from the other chamber portion, thereby causing the piston 262 to move accordingly (to the left or right, as viewed in FIG. 6). The first hydraulic fluid motor 250 is thus fluidly connected to or in fluid communication with the first control valve assembly 270 such that the first control valve assembly directs pressurized fluid to the first hydraulic motor and allows fluid to return from the first hydraulic motor.

When the steerable wheels 214a and 214b are in a straight ahead condition, the valve core 280 and valve sleeve 282 are in the open position illustrated in FIG. 7. When the valve core 280 and valve sleeve 282 are in the open position, the grooves 285 in the valve core 280 cooperate with the grooves 290 in the valve sleeve 282 to fluidly connect or provide fluid communication among the pump or high pressure fluid radial passages 294, the motor fluid radially extending passages 293 and 295, and the return radial passages 289. This results in the first control valve assembly 270 directing high pressure hydraulic fluid from the radial passage 294 to the internal return axial passage 292 and thereby to the reservoir (not shown). The first control valve assembly 270 is thus an open center control valve assembly. The general construction of the first control valve assembly 270 and first hydraulic fluid motor 250 are similar to the construction disclosed in U.S. Pat. No. 5,582,207.

When the valve core 280 is rotated in a clockwise direction, as viewed in FIG. 7, the lands 287b that do not include return radial passages 289 close off communication between the high pressure fluid radial passages 294 and the radially extending passages 295 that communicate with the second chamber portion 260 of the first hydraulic fluid motor 250. The radially extending passages 295 remain connected to or in fluid communication with the return radial passages 289, however. At the same time, the lands 287a that include return radial passages 289 close off communication between the return radial passages 289 and the radially extending passages 293 that communicate with the first chamber portion 258 in the housing 252. As a result, high pressure hydraulic fluid is directed into the first chamber portion 258, while the second chamber portion 260 is connected with to the low pressure reservoir (not shown).

When the valve core 280 is rotated in a counter-clockwise direction, as viewed in FIG. 7, the lands 287b that do not include return radial passages 289 close off communication between the high pressure fluid radial passages 294 and the radially extending passages 293 that communicate with the first chamber portion 258 of the first hydraulic fluid motor 250. The radially extending passages 293 remain connected to or in fluid communication with the return radial passages 289, however. At the same time, the lands 287a that include return radial passages 289 close off communication between the return radial passages 289 and the radially extending passages 295 that communicate with the second chamber portion 260 in the housing 252. As a result, high pressure hydraulic fluid is directed into the second chamber portion 260, while the first chamber portion 258 is connected with to the low pressure reservoir (not shown).

The ball screw section 306 of the valve sleeve 282 includes a helical groove 314 formed on its outer periphery. Bails 316 are located in the helical groove 314. The balls 316 are also located in the helical groove 264 in the inner surface 263 of the piston 262. As is well known in the art, axial movement of the piston 262 causes the ball screw section 306 to rotate which, in turn, causes the rest of the valve sleeve 282 to rotate.

A torsion bar 318 connects the valve core 280 and the valve sleeve 282. Specifically, one end portion of the torsion bar 318 is connected by a pin 320 to the valve section 288 of the valve core 28/0. The other end portion of the torsion bar 318 extends into the elongated passage 308 in the valve sleeve 282 and is connected by a pin 322 to the second axial end portion 302 of the valve sleeve 282.

As shown in FIG. 8, the second steering gear 224 is an integral hydraulic power steering gear, which includes a second hydraulic fluid motor 370 and a closed center second control valve assembly 390. The second control valve assembly 390, which is illustrated in greater detail in FIG. 9, is capable of directing hydraulic fluid flow away from the second hydraulic fluid motor 370, as will be explained in greater detail below. The second control valve assembly 390 is not, however, capable of directing hydraulic fluid flow to actuate the second hydraulic fluid motor 370.

The second steering gear 224 includes a two-piece housing 372 that forms a hydraulic power cylinder 374. The hydraulic power cylinder 374 defines an internal chamber 376 that receives a piston 382. The piston 382 divides the chamber 376 into a first chamber portion 378 and a second chamber portion 380.

The piston 382 includes an inner surface 383 that defines a bore extending axially into the piston 382 from one end. The inner surface 383 includes a helical groove 384. The piston 382 also has an external surface 387 that includes a set of external teeth 385. The teeth 385 mesh with a sector gear 386. The sector gear 386 is fixed to an output shaft 388, which extends outwardly from the housing 372. The output shaft 388 is connected to a pitman arm (not shown) which, in turn, is connected via the front steering linkage 218 to the front set 214 of steerable wheels to steer the vehicle 213. As the piston 382 moves in the chamber 376, the output shaft 388 is rotated to help operate the front steering linkage 218, which turns the steerable wheels 214a and 214b of the vehicle 213.

The second control valve assembly 390 is connected to the rotatable output shaft 240. The output shaft 240 rotates the shaft 242, but may also be rotated by the shaft 242, as will be explained in greater detail below.

The second control valve assembly 390 comprises first and second valve members 394 and 396, respectively. The first valve member 394 comprises a rotatable valve core 400. The second valve member 396 comprises rotatable a valve sleeve 402. The valve core 400 is located coaxially within the valve sleeve 402 and is supported by the valve sleeve for rotation relative to the valve sleeve. The valve core 400 is formed in one piece with the output shaft 240. The valve core 400 has oppositely disposed first and second axial end portions 404 and 406, respectively, and a valve section 408 between the end portions. The first axial end portion 404 of the valve core 400 projects beyond the valve sleeve 402. The second axial end portion 406 of the valve core 400 lies within the valve sleeve 402.

The valve section 408 of the valve core 400 has a plurality of circumferentially spaced, axially extending grooves 405a and 405b (FIG. 9) disposed between lands 407, as is known in the art. The valve core grooves 405a are fluidly connected to or in fluid communication with an internal return axial passage 412 via return radial passages 409. The internal return axial passage 412 extends from the valve section 408 of the valve core 400 to the second axial end portion 406. The internal return axial passage 412 communicates via passages (not shown) with a return line (not shown) communicating with a reservoir (not shown) of hydraulic fluid. The valve core grooves 405b are not connected in direct fluid communication with the internal return axial passage 412. The grooves 405b are also not directly connected with any radial passage corresponding to the return radial passages 409.

The valve sleeve 402 has oppositely disposed first and second axial end portions 420 and 422, respectively. The valve sleeve 402 further includes a sleeve section 424 adjacent the first axial end portion 420 and a ball screw section 426 adjacent the second axial end portion 422. An elongated passage 428 extends axially from the first axial end portion 420 of the valve sleeve 402 through the sleeve section 424 and the ball screw section 426 to the second axial end portion 422.

The first axial end portion 420 of the valve sleeve 402 includes first and second lugs (not shown) that are disposed in diametrically opposed cut-outs (not shown) in the valve core 400. After rotation of the valve core 400 through an angle of between 2° and 8° relative to the valve sleeve 402, the lugs engage the cut-outs in the valve core to cause the valve sleeve to be rotated along with the valve core. Such rotation of the valve sleeve 402 together with the valve core 400 causes the piston 382 to move axially in the chamber 376 and, hence, allows for manual steering of the vehicle even if a loss in hydraulic fluid pressure has occurred.

The sleeve section 424 of the valve sleeve 402 includes a plurality of fluid passages 414, which extend from the outer circumference of the sleeve section to the inner circumference of the sleeve section. The fluid passages 414 communicate with a chamber 430 in the housing 372. The chamber 430 is capable of being fluidly connected to or in fluid communication with a hydraulic pump (not shown). In the present invention, however, the chamber 430 is not fluidly connected to or in fluid communication with a hydraulic pump.

Axially extending grooves 410 and 411 are formed in the inner circumferential surface of the valve sleeve 402, as is known in the art. The grooves 410 in the valve sleeve 402 are fluidly connected to or in fluid communication with the first chamber portion 378 in the housing 372 via radially extending fluid passages 413. The grooves 411 are fluidly connected to or in fluid communication with the second chamber portion 380 in the housing 372 via radially extending fluid passages 415. As is known in the art, when the valve core 400 is rotated relative to the valve sleeve 402, in either a clockwise or a counter-clockwise direction, as viewed in FIG. 9, hydraulic fluid is vented through the grooves and associated passages from one of the first and second chamber portions 378 and 380.

When the steerable wheels 214a and 214b are in a straight ahead condition, the valve core 400 and valve sleeve 402 are in the closed position illustrated in FIG. 9. When the valve core 400 and valve sleeve 402 are in the closed position, the lands 407 on the valve core 400 cooperate with the valve sleeve 402 to block fluid communication between the fluid passage 414 and the motor fluid passages 413 and 415. This results in the second control valve assembly 390 being a closed center valve assembly. The general construction of the second control valve assembly 390 and the second hydraulic fluid motor 370 are similar to the construction disclosed in U.S. Pat. No. 7,484,588.

The ball screw section 426 of the valve sleeve 402 includes a helical groove 434 formed on its outer periphery. Balls 436 are located in the helical groove 434. The balls 436 are also located in the helical groove 384 in the inner surface 383 of the piston 382. As is well known in the art, axial movement of the piston 382 causes the ball screw section 426 to rotate which, in turn, causes the rest of the valve sleeve 402 to rotate.

A torsion bar 438 connects the valve core 400 and the valve sleeve 402. Specifically, one end of the torsion bar 438 is connected by a pin 440 to the first axial end portion 404 of the valve core 160. The other end of the torsion bar 438 extends through the elongated passage 428 in the valve sleeve 402 and is connected by a pin 442 to the second axial end portion 406 of the valve sleeve.

As can be seen in FIG. 5 and as described above, the input shaft 236 of the first steering gear 222 is operatively connected to the vehicle steering wheel 234 through a steering shaft 238. The first steering gear 222 is also oriented so that the input shaft 326 is presented toward the front of the vehicle 213. The second steering gear 224, on the other hand, is actuatable in response to rotation of the vehicle steering wheel 234, but is not operatively connected to the steering wheel through the steering shaft 238. The second steering gear 224 is also oriented in a direction opposite the direction in which the first steering gear 222 is oriented so that the rotatable output shaft 240 is presented toward the rear of the vehicle 213 and can be operatively connected to the third steering gear 226.

In order for the second steering gear 224 to operate in tandem or together with the first steering gear 222 without being operatively connected to the steering wheel through the steering shaft 238, the first and second hydraulic fluid motors 250 and 370 of the first and second steering gears 222 and 224, respectively, are fluidly connected together or in fluid communication with each other. A first hydraulic fluid line 450 (FIG. 5) connects the first chamber portion 258 of the first hydraulic fluid motor 250 with the axially extending grooves 411 in the second control valve assembly 390 and thus with the second chamber portion 380 of the second hydraulic fluid motor 370. A second hydraulic fluid line 452 (FIG. 5) connects the second chamber portion 260 of the first hydraulic fluid motor 250 with the axially extending grooves 410 in the second control valve assembly 390 and thus with the first chamber portion 378 of the second hydraulic fluid motor 370.

As a result of the connections provided by the first and second hydraulic fluid lines 450 and 452, when the first control valve assembly 270 of the first steering gear 222 directs high pressure hydraulic fluid into the first chamber portion 258 of the first hydraulic fluid motor 250 to cause the piston 262 to move to the right, as viewed in FIG. 6, the high pressure hydraulic fluid will also be directed through the first hydraulic fluid line 450 into the axially extending grooves 411 and thus into the second chamber portion 380 of the second hydraulic fluid motor 370 to cause the piston 382 to move to the right, as viewed in FIG. 8. At the same time, hydraulic fluid in the first chamber portion 378 of the second hydraulic fluid motor 370 will flow out the first chamber portion through the axially extending grooves 410 and the second hydraulic fluid line 452 to the low pressure reservoir (not shown). Similarly, when the first control valve assembly 270 of the first steering gear 222 directs high pressure hydraulic fluid into the second chamber portion 260 to cause the piston 262 to move to the left, as viewed in FIG. 6, the high pressure hydraulic fluid will also be directed through the second hydraulic fluid line 452 into the axially extending grooves 410 and thus the first chamber portion 378 of the second hydraulic fluid motor 370 to cause the piston 382 to move to the left, as viewed in FIG. 8. At the same time, hydraulic fluid in the second chamber portion 380 of the second hydraulic fluid motor 370 will flow out of the second chamber portion through the axially extending grooves 411 and the first hydraulic fluid line 450 to the low pressure reservoir (not shown).

As previously explained, axial movement of the piston 382 of the second hydraulic fluid motor 370 causes the ball screw section 426 of the valve sleeve 402 to rotate, which, in turn, causes the rest of the valve sleeve 402 to rotate. Because the valve sleeve 402 of the second control valve assembly 390 of the second steering gear 224 is connected to the valve core 400 through the torsion bar 438, rotation of the valve sleeve 402 is normally transmitted to the valve core 400. The valve core 400 is formed in one piece with the output shaft 240. Consequently, when the valve core 400 rotates, the output shaft 240 also normally rotates. Rotation of the output shaft 240 is transmitted to the shaft 242, which is operatively connected to an input shaft (not shown) of the third steering gear 226. Specifically, the shaft 242 is operatively coupled to an input shaft of the third control valve assembly 244. The third steering gear 226 is an open center integral steering gear, constructed like the first steering gear 222, so that rotation of the input shaft (not shown) of the third steering gear 226 will produce movement of the third control valve assembly 244 of the third steering gear and consequent movement of a piston (not shown) in a third hydraulic fluid motor 248 of the third steering gear. More particularly, movement of the third control valve assembly 244 will direct pressurized fluid to the third hydraulic fluid motor 248 and will allow fluid to return from the third hydraulic motor. The third hydraulic motor 248 is operatively connected, via the rear steering linkage 220, to the second set 216 of steerable wheels 216a and 216b. The output shaft 240 of the second steering gear 224 is thus operatively connected to the second set 216 of steerable wheels 216a and 216b via the shaft 242, the third steering gear 226, and the rear steering linkage 220.

As long as the output shaft 240 and the shaft 242 do not experience significant resistance to rotation from the third steering gear 226, rotation of the output shaft 240 is transmitted to the input shaft (not shown) of the third steering gear 226. If the third steering gear 226 experiences resistance to its normal operation as a result of, for example, excessive resistance to turning of the rear steerable wheels 216a and 216b, excessive torque may be applied to the output shaft 240. When the torque applied to the output shaft 240 of the second steering gear 224 is at or below a predetermined value, the output shaft 240 will continue to rotate in the normal manner and the second control valve assembly will remain in a neutral or unactuated condition. When the torque applied to the output shaft 240 of the second steering gear 224 is above the predetermined value, however, the torsion bar 438 will begin to twist about its length, so that the excess torque is not transmitted from the output shaft 240 and, thus, the valve core 400 to the valve sleeve 402. In this way, the torsion bar 438 helps prevent a large torque from being applied to the second steering gear that could damage the second steering gear 224. The torsion bar 438 thus also functions as a clutch or in manner similar to the steering gear clutch 12 of FIG. 12.

In addition to preventing a large torque from being applied to the second steering gear 224, twisting of the torsion bar 438 when the torque applied to the output shaft 240 of the second steering gear is above the predetermined value also directs pressurized hydraulic fluid away from the second hydraulic fluid motor 370. Specifically, as the torsion bar 438 twists about its length or central longitudinal axis, the valve core 400 rotates relative to the valve sleeve 402 and the second control valve assembly 390 thus moves to an actuated position or condition. If the valve core 400 rotates in a clockwise direction, as viewed in FIG. 9, relative to the valve sleeve 402, the axially extending grooves 405a in the valve core are connected with the axially extending grooves 410 in the valve sleeve 402. The second hydraulic fluid line 452, which is fluidly connected to or in fluid communication with the axially extending grooves 410, is thus fluidly connected to or in fluid communication with the return radial passages 409, the internal return axial passage 412 and a reservoir (not shown) of hydraulic fluid. High pressure fluid in the second hydraulic fluid line 452 and the first chamber portion 378 of the second hydraulic fluid motor 370 is thus directed or vented to the reservoir. If the valve core 400 rotates in a counter-clockwise direction, as viewed in FIG. 9, relative to the valve sleeve 402, the axially extending grooves 405a in the valve core are connected with the axially extending grooves 411 in the valve sleeve 402. The first hydraulic fluid line 450, which is fluidly connected to or in fluid communication with the axially extending grooves 411, is thus fluidly connected to or in fluid communication with the return radial passages 409, the internal return axial passage 412 and the reservoir (not shown) of hydraulic fluid. High pressure fluid in the first hydraulic fluid line 450 and the second chamber portion 380 in the second hydraulic fluid motor 370 is thus directed or vented to the reservoir.

As alternative or additional protection against the application of a large torque to the second steering gear 224, the second steering gear may include a releasable latch assembly 460. As shown in FIGS. 10 and 11, the latch assembly 460 is used together with the torsion bar 438. The latch assembly 460 includes two spring-biased pin assemblies 462. Each pin assembly 462 includes a sleeve 464, a pin 466, and a biasing spring 468. Each sleeve 464 is cylindrical in shape. Each of the ends of the sleeve 464 is open, but one end includes a flange 470 that extends radially inward. Each pin 466 is also cylindrical, but one end of each pin includes a diametrically extending, tapered nose 472. Each biasing spring 468 is a coil spring. When assembled together into a pin assembly 462, each sleeve 464 receives a corresponding pin 466 and a corresponding biasing spring 468. The pin 466 is located at one end of the sleeve 464, while the biasing spring 468 is located at the other end of the sleeve. At least the nose 472 of the pin 466 projects through an open end of the sleeve 464. One end of the biasing spring 468 engages the flange 470 at the opposite end of the sleeve 464. The other end of the biasing spring 468 engages the end of the pin 466 opposite the nose 472.

Each pin assembly 462 is received in a bore 474 formed in the output shaft 240. The nose 472 of the pin 466 in each pin assembly 462 projects radially outward from the output shaft 240 and engages a notch or detent 476 formed in the valve sleeve 402 or other component fixed to the ball screw section 426. The detent 476 has a shape that is complementary to the shape of the nose 472.

In a normal condition, the pin assemblies 462 connect the output shaft 240 to the valve sleeve 402 and the ball screw section 426 so that the shaft does not move relative to the ball screw section. The pin assemblies 462 thus effectively "short-circuit" the torsion bar 438 so that no torque is applied to the torsion bar. As long as the output shaft 240 and the shaft 242 do not experience significant resistance to rotation from the third steering gear 226, rotation of the output shaft 240 is transmitted to the input shaft (not shown) of the third steering gear 226. If the third steering gear 226 experiences resistance to its normal operation as a result of, for example, excessive resistance to turning of the rear steerable wheels 216*a* and 216*b*, excessive torque may be applied to the output shaft 240.

When the torque applied to the output shaft 240 of the second steering gear 224 is at or below a predetermined value, the output shaft 240 will continue to rotate in the normal manner. When the torque applied to the output shaft 240 of the second steering gear 224 is above the predetermined value, however, the nose 472 of each pin 466 will tend to cam or slide out of the corresponding detent 476. More specifically, the load applied to the pin 466 causes the corresponding biasing spring 468 to compress and thereby allow the pin 466 to move radially inward toward the output shaft 240 and into the corresponding sleeve 464. After the pin 466 of each pin assembly 462 has moved out of its corresponding detent 476, the output shaft 240 is connected to the valve sleeve 402 and the ball screw section 426 only through the torsion bar 438. The torsion bar 438 will begin to twist about its length, so that the excess torque is not transmitted from the output shaft 240 and, thus, the valve core 400 to the valve sleeve 402. In this way, the torsion bar 438 helps prevent a large torque from being applied to the second steering gear that could damage the second steering gear 224. The torsion bar 438 thus also functions as a clutch or in manner similar to the steering gear clutch 12 of FIG. 12.

As indicated above, the releasable latch assembly 460 may be (a) included in the second steering gear 224 by itself without the torsion bar 438, (b) included in the second steering gear in combination with the torsion bar 438 (as shown), or (c) left out of the second steering gear entirely.

From the above description of the invention, those skilled in the art will perceive improvements, changes and modifications. Such improvements, changes and modifications within the skill of the art are intended to be covered by the appended claims.

The invention claimed is:

1. A steering system for turning multiple sets of steerable wheels comprising:
   a first steering gear operatively connected to a steering wheel and to a first set of steerable wheels to effect turning of the first set of steerable wheels in response to rotation of the steering wheel, the first steering gear including a first control valve assembly, the first control valve assembly directing pressurized fluid to a first hydraulic fluid motor and allowing fluid to return from the first hydraulic fluid motor, the first hydraulic fluid motor being operatively connected to the first set of steerable wheels; and
   a second steering gear operatively connected to the first set of steerable wheels and fluidly connected to the first steering gear to assist in turning of the first set of steerable wheels in response to rotation of the steering wheel, the second steering gear including a second control valve assembly,
   the first control valve assembly being fluidly connected to the second control valve assembly such that the first control valve assembly directs pressurized fluid to a second hydraulic fluid motor and allows fluid to return from the second hydraulic fluid motor, an output shaft of the second steering gear rotating in response to movement of the first control valve assembly when a torque below a predetermined value is applied to the output shaft, the second control valve assembly remaining in a neutral condition when said torque below a predetermined value is applied to the output shaft, the output shaft rotating to cause the second control valve assembly to assume an actuated condition to direct pressurized fluid away from the second hydraulic fluid motor when a torque above the predetermined value is applied to the output shaft of the second steering gear.

2. A steering system as set forth in claim 1 wherein the output shaft of the second steering gear is coupled to a portion of the second control valve assembly by a torsion bar.

3. A steering system as set forth in claim 1 wherein the output shaft of the second steering gear is coupled to a portion of the second control valve assembly by a releasable latch assembly.

4. A steering system as set forth in claim 1 wherein the output shaft of the second steering gear is operatively connected to a second set of steerable wheels.

5. A steering system as set forth in claim 1 further comprising a third steering gear operatively connected to a second set of steerable wheels and to the output shaft of the second steering gear to effect turning of the second set of steerable wheels in response to rotation of the steering wheel, the third steering gear including a third control valve assembly, the third control valve assembly directing pressurized fluid to a third hydraulic fluid motor and allowing fluid to return from the third hydraulic motor, the third hydraulic fluid motor being operatively connected to the second set of steerable wheels.

6. A steering system for turning multiple sets of steerable wheels comprising:
- a first steering gear operatively connected to a steering wheel and to a first set of steerable wheels to effect turning of the first set of steerable wheels in response to rotation of the steering wheel, the first steering gear including a first control valve assembly, the first control valve assembly directing pressurized fluid to a first hydraulic fluid motor and allowing fluid to return from the first hydraulic fluid motor, the first hydraulic fluid motor being operatively connected to the first set of steerable wheels;
- a second steering gear operatively connected to the first set of steerable wheels and fluidly connected to the first steering gear to assist in turning of the first set of steerable wheels in response to rotation of the steering wheel, the second steering gear including a second control valve assembly, the second control valve assembly being capable of allowing fluid to return from a second hydraulic fluid motor; and
- a third steering gear operatively connected to a second set of steerable wheels and to an output shaft of the second steering gear to effect turning of the second set of steerable wheels in response to rotation of the steering wheel, the third steering gear including a third control valve assembly, the third control valve assembly directing pressurized fluid to a third hydraulic fluid motor and allowing fluid to return from the third hydraulic fluid motor, the third hydraulic fluid motor being operatively connected to the second set of steerable wheels,
- the second hydraulic fluid motor being fluidly connected to the first control valve assembly such that the first control valve assembly directs pressurized fluid to the second hydraulic fluid motor and allows fluid to return from the second hydraulic fluid motor, the output shaft of the second steering gear rotating in response to movement of the first control valve assembly when a torque below a predetermined value is applied to the output shaft, the second control valve assembly remaining in a neutral condition when said torque below a predetermined value is applied to the output shaft, the output shaft rotating to cause the second control valve assembly to assume an actuated condition to direct pressurized fluid away from the second hydraulic fluid motor when a torque above the predetermined value is applied to the output shaft of the second steering gear.

* * * * *